United States Patent
Lundin et al.

(10) Patent No.: US 11,694,018 B2
(45) Date of Patent: Jul. 4, 2023

(54) MACHINE-LEARNING BASED GENERATION OF TEXT STYLE VARIATIONS FOR DIGITAL CONTENT ITEMS

(71) Applicant: salesforce.com, inc., San Francisco, CA (US)

(72) Inventors: Jessica Lundin, Seattle, WA (US); Owen Winne Schoppe, Orinda, CA (US); Xing Han, Austin, TX (US); Michael Reynolds Sollami, Cambridge, MA (US); Brian J. Lonsdorf, Moss Beach, CA (US); Alan Martin Ross, San Francisco, CA (US); David J. Woodward, Bozeman, MT (US); Sonke Rohde, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 144 days.

(21) Appl. No.: 17/163,162

(22) Filed: Jan. 29, 2021

(65) Prior Publication Data
US 2022/0245322 A1 Aug. 4, 2022

(51) Int. Cl.
*G06F 40/169* (2020.01)
*G06F 40/103* (2020.01)
(Continued)

(52) U.S. Cl.
CPC .......... *G06F 40/103* (2020.01); *G06F 40/284* (2020.01); *G06N 3/049* (2013.01); *G06T 11/60* (2013.01)

(58) Field of Classification Search
CPC .... G06F 40/103; G06F 40/284; G06F 40/253; G06F 40/56; G06F 40/30; G06F 40/166;
(Continued)

(56) References Cited

U.S. PATENT DOCUMENTS

| | | | |
|---|---|---|---|
| 6,421,733 B1 * | 7/2002 | Tso | H04L 67/02 358/402 |
| 10,679,012 B1 * | 6/2020 | Salimov | G06F 40/30 |

(Continued)

FOREIGN PATENT DOCUMENTS

| | | | | |
|---|---|---|---|---|
| AU | 2003221986 A1 * | 11/2003 | | G06N 3/0454 |
| AU | 2014201827 A1 * | 10/2014 | | G06F 16/353 |

(Continued)

OTHER PUBLICATIONS

Arjovsky, M. et al., "Wasserstein Generative Adversarial Networks," Proceedings of the 34th International Conference on Machine Learning, Aug. 2017, pp. 214-223.

(Continued)

*Primary Examiner* — Hassan Mrabi
(74) *Attorney, Agent, or Firm* — Fenwick & West LLP

(57) ABSTRACT

An online system generates a set of content item variations for a reference content item that include different styles of text for the content item. The different styles of text are generated by applying machine-learned style transfer models, for example, neural network based models to reference text of the reference content item. The text variations retain the textual content of the reference text but are synthesized with different styles. The online system can provide the content item variations to users on an online experimental platform to collect user interaction information that may indicate how users respond to different styles of text. The online system or the content providers can effectively target users with content items that include the style of text the users respond to based on the collected information.

19 Claims, 9 Drawing Sheets

(51) Int. Cl.
 G06N 3/049 (2023.01)
 G06T 11/60 (2006.01)
 G06F 40/284 (2020.01)

(58) Field of Classification Search
 CPC ..... G06F 40/205; G06F 40/289; G06N 3/049; G06N 3/044; G06N 3/045; G06N 3/084; G06T 11/60
 See application file for complete search history.

(56) References Cited

U.S. PATENT DOCUMENTS

| | | | | |
|---|---|---|---|---|
| 10,957,086 | B1* | 3/2021 | Mathon | G06N 5/022 |
| 11,082,789 | B1* | 8/2021 | Mimilakis | G10L 21/02 |
| 11,146,599 | B1* | 10/2021 | Jackson | H04L 65/1101 |
| 11,188,719 | B1* | 11/2021 | Anand | G06F 40/274 |
| 11,314,922 | B1* | 4/2022 | Ramezani | G06F 40/10 |
| 11,334,323 | B1* | 5/2022 | Hatfield | G06F 40/143 |
| 11,403,349 | B2* | 8/2022 | Mannar | G06F 16/951 |
| 2014/0012671 | A1* | 1/2014 | Ye | G06Q 30/0251 705/14.57 |
| 2014/0244405 | A1* | 8/2014 | Cohen | G06Q 30/0276 705/14.72 |
| 2016/0294759 | A1* | 10/2016 | Huang | H04L 51/063 |
| 2018/0032505 | A1* | 2/2018 | Hoetzer | G06Q 40/08 |
| 2018/0247024 | A1* | 8/2018 | Divine | G06T 19/006 |
| 2018/0300423 | A1* | 10/2018 | Dufour | G06F 16/9577 |
| 2019/0034976 | A1* | 1/2019 | Hamedi | G06Q 30/0243 |
| 2019/0057450 | A1* | 2/2019 | Mark | G06N 20/00 |
| 2019/0272325 | A1* | 9/2019 | Korn | G09B 19/00 |
| 2019/0325628 | A1* | 10/2019 | Dubey | G06F 30/00 |
| 2019/0392487 | A1* | 12/2019 | Duke | G06N 3/08 |
| 2020/0019370 | A1* | 1/2020 | Doggett | G10L 15/1822 |
| 2020/0175390 | A1* | 6/2020 | Conti | G06F 11/3672 |
| 2020/0401886 | A1* | 12/2020 | Deng | G06N 3/088 |
| 2021/0133670 | A1* | 5/2021 | Cella | G06N 5/04 |
| 2021/0182976 | A1* | 6/2021 | Poslavsky | G06N 3/0427 |
| 2021/0192800 | A1* | 6/2021 | Dutta | G06T 11/00 |
| 2021/0193110 | A1* | 6/2021 | Park | G06F 40/279 |
| 2021/0248149 | A1* | 8/2021 | Somani | G06F 16/2255 |
| 2021/0264236 | A1* | 8/2021 | Xu | G06V 10/764 |
| 2021/0319306 | A1* | 10/2021 | Leite Pinheiro de Paiva | H04L 67/5681 |
| 2021/0334598 | A1* | 10/2021 | Tan | G06K 9/6255 |
| 2021/0342836 | A1* | 11/2021 | Cella | H04L 67/12 |
| 2021/0374334 | A1* | 12/2021 | Li | G06F 17/16 |
| 2021/0383070 | A1* | 12/2021 | Hunter | G06F 40/103 |
| 2022/0035988 | A1* | 2/2022 | Mason | G06F 40/186 |
| 2022/0036002 | A1* | 2/2022 | Sriharsha | G06N 5/04 |
| 2022/0051132 | A1* | 2/2022 | Oke | G06F 40/30 |
| 2022/0067287 | A1* | 3/2022 | Cobb | G06F 16/22 |
| 2022/0100959 | A1* | 3/2022 | Nakadai | G06F 40/289 |
| 2022/0108509 | A1* | 4/2022 | Swaminathan | G06K 9/6262 |
| 2022/0147702 | A1* | 5/2022 | Li | G06V 10/40 |
| 2022/0215948 | A1* | 7/2022 | Bardot | G16H 40/67 |
| 2022/0229984 | A1* | 7/2022 | Miao | G06N 20/00 |
| 2022/0230000 | A1* | 7/2022 | Jalaluddin | G06F 40/35 |
| 2022/0237368 | A1* | 7/2022 | Tran | G06F 40/194 |

FOREIGN PATENT DOCUMENTS

| | | | | |
|---|---|---|---|---|
| CN | 108363690 | A * | 8/2018 | |
| CN | 110889883 | A * | 3/2020 | G06F 16/432 |
| CN | 112016307 | A * | 12/2020 | |
| CN | 112364602 | A * | 2/2021 | |
| CN | 112446217 | A * | 3/2021 | |
| CN | 112463968 | A * | 3/2021 | |
| CN | 112749274 | A * | 5/2021 | G06F 3/04842 |
| CN | 109583952 | B * | 3/2022 | G06F 40/289 |
| CN | 109213975 | B * | 4/2022 | G06F 40/126 |
| CN | 114722141 | A * | 7/2022 | |
| DE | 102020100638 | A1 * | 7/2021 | G06F 16/353 |
| JP | 2022032583 | A * | 2/2022 | G06F 3/04842 |
| WO | WO-2021176714 | A1 * | 9/2021 | |
| WO | WO-2022103397 | A1 * | 5/2022 | |
| WO | WO-2022139807 | A1 * | 6/2022 | |

OTHER PUBLICATIONS

Bahuleyan, H. et al., "Variational Attention for Sequence-to-Sequence Models," Proceedings of the 27th International Conference on Computational Linguistics, Aug. 2018, pp. 1672-1682.

Balikas, G. et al., "Multitask Learning for Fine-Grained Twitter Sentiment Analysis," SIGIR '17: Proceedings of the 40th International ACM SIGIR Conference on Research and Development in Information Retrieval, Aug. 2017, pp. 1005-1008.

Banchs, R.E. et al., "AM-FM: A Semantic Framework for Translation Quality Assessment," Proceedings of the 49th Annual Meeting of the Association for Computational Linguistics: Short Papers, Jun. 2011, pp. 153-158.

Banerjee, S. et al., "METEOR: An Automatic Metric for MT Evaluation with Improved Correlation with Human Judgments," Proceedings of the ACL Workshop on Intrinsic and Extrinsic Evaluation Measures for Machine Translation and/or Summarization, Jun. 2005, pp. 65-72.

Bao, Y. et al., "Generating Sentences from Disentangled Syntactic and Semantic Spaces," Proceedings of the 57th Annual Meeting of the Association for Computational Linguistics, Jul. 2019, pp. 6008-6019.

Bousmalis, K. et al., "Domain Separation Networks," 30th Conference on Neural Information Processing Systems (NIPS 2016), Dec. 2016, pp. 343-351.

Bowman, S.R. et al., "Generating Sentences from a Continuous Space," Proceedings of the 20th SIGNLL Conference on Computational Natural Language Learning (CoNLL), Aug. 2016, pp. 10-21.

Braud, C. et al., "Is writing style predictive of scientific fraud?," arXiv:1707.04095, Jul. 13, 2017, pp. 1-6.

Caruana, R., "Multitask Learning," Chapter 5: Learning to Learn, 1998, pp. 95-133.

Chen, X. et al., "Adversarial Multi-Criteria Learning for Chinese Word Segmentation," Proceedings of the 55th Annual Meeting of the Association for Computational Linguistics, Jul.-Aug. 2017, pp. 1193-1203.

Chen, X. et al., "InfoGAN: Interpretable Representation Learning by Information Maximizing Generative Adversarial Nets," 30th Conference on Neural Information Processing Systems (NIPS 2016), Dec. 2016, pp. 2172-2180.

Cho, K. et al., "Learning Phrase Representations using RNN Encoder-Decoder for Statistical Machine Translation," Proceedings of the 2014 Conference on Empirical Methods in Natural Language Processing (EMNLP), Oct. 2014, pp. 1724-1734.

Conneau, A. et al., "Word Translation without Parallel Data," ICLR 2018, Feb. 15, 2018, pp. 1-14.

Doddington, G.R. et al., "The NIST speaker recognition evaluation—Overview, methodology, systems, results, perspective," Speech Communication, vol. 31, Issues 2-3, Jun. 2000, pp. 225-254.

Ficler, J. et al., "Controlling Linguistic Style Aspects in Neural Language Generation," Proceedings of the Workshop on Stylistic Variation, Sep. 2017, pp. 94-104.

Fu, Z. et al., "Style Transfer in Text: Exploration and Evaluation," The Thirty-Second AAAI Conference on Artificial Intelligence (AAAI-18), Apr. 2018, pp. 663-670.

Ganin, Y. et al., "Unsupervised Domain Adaptation by Backpropagation," Proceedings of the 32nd International Conference on Machine Learning, Jul. 2015, pp. 1180-1189.

Gatys, L.A. et al., "Image Style Transfer Using Convolutional Neural Networks," Proceedings of the IEEE Conference on Computer Vision and Pattern Recognition (CVPR), Jun. 2016, pp. 2414-2423.

Gatys, L.A. et al., "Preserving Color in Neural Artistic Style Transfer," arXiv:1606.05897, Jun. 19, 2016, pp. 1-8.

Ghazvininejad, M. et al., "Generating Topical Poetry," Proceedings of the 2016 Conference on Empirical Methods in Natural Language Processing, Nov. 2016, pp. 1183-1191.

(56) References Cited

OTHER PUBLICATIONS

Goodfellow, I.J. et al., "Generative Adversarial Nets," NIPS'14: Proceedings of the 27th International Conference on Neural Information Processing Systems, vol. 2, Dec. 2014, pp. 2672-2680.
He, R. et al., "Ups and Downs: Modeling the Visual Evolution of Fashion Trends with One-Class Collaborative Filtering," WWW '16: Proceedings of the 25th International Conference on World Wide Web, Apr. 2016, pp. 507-517.
Higgins, I. et al., "Beta-VAE: Learning basic visual concepts with a constrained variational framework," ICLR, Apr. 2017, pp. 1-13.
Hinton, G. et al., "Lecture 6e-rmsprop: Divide the Gradient by a Running Average of Its Recent Magnitude," COURSERA: Neural Networks for Machine Learning, vol. 4, 2012, pp. 26-31.
Hu, M. et al., "Mining and Summarizing Customer Reviews," KDD'04, Aug. 22-25, 2004, pp. 168-177.
Hu, Z. et al., "Toward Controlled Generation of Text," Proceedings of the 34th International Conference on Machine Learning, Aug. 2017, pp. 1587-1596.
Jernite, Y. et al., "Discourse-Based Objectives for Fast Unsupervised Sentence Representation Learning," arXiv: 1705.00557, Apr. 23, 2017, pp. 1-8.
Jhamtani, H. et al., "Shakespearizing Modern Language Using Copy-Enriched Sequence-to-Sequence Models," arXiv:1707.01161, Jul. 20, 2017, pp. 1-10.
Kim, Y., "Convolutional Neural Networks for Sentence Classification," Proceedings of the 2014 Conference on Empirical Methods in Natural Language Processing (EMNLP), Oct. 2014, pp. 1746-1751.
Kingma, D.P. et al., "Adam: A Method for Stochastic Optimization," arXiv:1412.6980, Dec. 22, 2014, pp. 1-9.
Kingma, D.P. et al., "Auto-Encoding Variational Bayes," arXiv:1312.6114, Dec. 20, 2013, pp. 1-9.
Kneser, R. et al., "Improved backing-off for m-gram language modeling," ICASSP, 1995, pp. 181-184.
Krippendorff, K., "Content Analysis: An Introduction to Its Methodology," Sage Publications, ISBN 0-7619-1544-3, 2004, pp. 1-421.
Kullback, S. et al., "On information and sufficiency," The Annals of Mathematical Statistics 22(1), 1951, pp. 79-86.
Lample, G. et al., "Phrase-Based & Neural Unsupervised Machine Translation," Proceedings of the 2018 Conference on Empirical Methods in Natural Language Processing, Oct. 2018, pp. 5039-5049.
Lample, G. et al., "Unsupervised Machine Translation Using Monolingual Corpora Only," ICLR, Feb. 15, 2018, pp. 1-14.
Li, J. et al., "A Persona-Based Neural Conversation Model," arXiv:1603.06155, Jun. 8, 2016, pp. 1-10.
Li, J. et al., "Delete, Retrieve, Generate: A Simple Approach to Sentiment and Style Transfer," Proceedings of NAACL-HLT 2018, Jun. 2018, pp. 1865-1874.
Li, Y. et al., "Demystifying Neural Style Transfer," Proceedings of the Twenty-Sixth International Joint Conference on Artificial Intelligence (IJCAI-17), Aug. 2017, pp. 2230-2236.
Lichman, M. et al., "UCI Machine Learning Repository," University of California, School of Information and Computer Science, 2013, pp. 1-2, [Online] [Retrieved on Apr. 20, 2021] Retrieved from the Internet <URL: http://archive.ics.uci.edu/ml>.
Lin, C.-Y., "ROUGE: A Package for Automatic Evaluation of Summaries," Proceedings of the ACL-04 workshop, Text Summarization Branches Out, Jul. 2004, pp. 1-8.
Logeswaran, L. et al., "Content preserving text generation with attribute controls," 32nd Conference on Neural Information Processing Systems (NeurIPS 2018), Montréal, Canada, Dec. 2018, pp. 5108-5118.
Long, M. et al., "Deep Transfer Learning with Joint Adaptation Networks," Proceedings of the 34th International Conference on Machine Learning, Aug. 2017, pp. 2208-2217.
Mikolov, T. et al., "Distributed representations of words and phrases and their compositionality," NIPS'13: Proceedings of the 26th International Conference on Neural Information Processing Systems—vol. 2, Dec. 2013, pp. 3111-3119.
Mueller, J. et al., "Sequence to Better Sequence: Continuous Revision of Combinatorial Structures," Proceedings of the 34th International Conference on Machine Learning, Aug. 2017, pp. 2536-2544.
Nogueira Dos Santos, C. et al., "Fighting Offensive Language on Social Media with Unsupervised Text Style Transfer," Proceedings of the 56th Annual Meeting of the Association for Computational Linguistics (Short Papers), Jul. 2018, pp. 189-194.
Papineni, K. et al., "BLEU: a Method for Automatic Evaluation of Machine Translation," Proceedings of the 40th Annual Meeting of the Association for Computational Linguistics (ACL), Jul. 2002, pp. 311-318.
Pennington, J. et al., "GloVe: Global Vectors for Word Representation," Proceedings of the 2014 Conference on Empirical Methods in Natural Language Processing (EMNLP), Oct. 2014, pp. 1532-1543.
Prabhumoye, S. et al., "Style Transfer Through Back-Translation," Proceedings of the 56th Annual Meeting of the Association for Computational Linguistics (Long Papers), Jul. 2018, pp. 866-876.
Rao, S. et al., "Dear Sir or Madam, May I Introduce the GYAFC Dataset: Corpus, Benchmarks and Metrics for Formality Style Transfer," Proceedings of NAACL-HLT 2018, Jun. 2018, pp. 129-140.
Retail News Asia, "Alibaba Says Its AI Copywriting Tool Passed the Turing Test," Jul. 6, 2018, pp. 1-2, [Online] [Retrieved on Apr. 20, 2021] Retrieved from the Internet <URL: https://www.retailnews.asia/alibaba-says-its-ai-copywriting-tool-passed-the-turing-test/>.
Rumelhart, D.E. "Learning internal representations by error propagation," Chapter 8: Parallel Distributed Processing: Explorations in the Microstructure of Cognition, vol. 1, 1986, pp. 318-362.
Shen, T. et al., "Style Transfer from Non-Parallel Text by Cross-Alignment," 31st Conference on Neural Information Processing Systems (NIPS 2017), Dec. 2017, pp. 6833-6844.
Stent, A. et al., "Evaluating Evaluation Methods for Generation in the Presence of Variation," CICLing 2005: Computational Linguistics and Intelligent Text Processing, Feb. 2005, pp. 341-351.
Sutskever, I. et al., "Sequence to Sequence Learning with Neural Networks," Advances in Neural Information Processing Systems, Dec. 2014, pp. 3104-3112.
Tao, C. et al., "RUBER: An Unsupervised Method for Automatic Evaluation of Open-Domain Dialog Systems," arXiv:1701.03079, Jul. 16, 2017, pp. 1-10.
Van Der Maaten, L. et al., "Visualizing Data using t-SNE," Journal of Machine Learning Research, vol. 9, Nov. 2008, pp. 2579-2605.
Vinyals, O. et al., "Pointer Networks," arXiv:1506.03134, Jan. 2, 2017, pp. 1-9.
Xu, J. et al., "Unpaired Sentiment-to-Sentiment Translation: A Cycled Reinforcement Learning Approach," Proceedings of the 56th Annual Meeting of the Association for Computational Linguistics (Long Papers), Jul. 2018, pp. 979-988.
Yan, R. et al., "i, Poet: Automatic Chinese Poetry Composition through a Generative Summarization Framework under Constrained Optimization," Proceedings of the Twenty-Third International Joint Conference on Artificial Intelligence, Aug. 2013, pp. 2197-2203.
Yan, R., "i, Poet: Automatic Poetry Composition through Recurrent Neural Networks with Iterative Polishing Schema," Proceedings of the Twenty-Fifth International Joint Conference on Artificial Intelligence (IJCAI-16), Jul. 2016, pp. 2238-2244.
Zeiler, M.D., "ADADELTA: An Adaptive Learning Rate Method," arXiv:1212.5701, Dec. 22, 2012, pp. 1-6.
Zhang, Y. et al., "SHAPED: Shared-Private Encoder-Decoder for Text Style Adaptation," Proceedings of NAACL-HLT 2018, Jun. 2018, pp. 1528-1538.
Zhao, J. et al., "Adversarially Regularized Autoencoders," ICML, Jul. 2018, pp. 5897-5906.
Zhou, H. et al., "Emotional Chatting Machine: Emotional Conversation Generation with Internal and External Memory," arXiv:1704.01074, Jun. 1, 2018, pp. 1-9.
Zhu, J-Y. et al., "Unpaired Image-to-Image Translation using Cycle-Consistent Adversarial Networks," arXiv:1703.10593, Mar. 30, 2017, pp. 1-18.

\* cited by examiner

MACHINE-LEARNING BASED GENERATION OF TEXT STYLE VARIATIONS FOR DIGITAL CONTENT ITEMS

BACKGROUND

This disclosure generally relates to generating text style variations using machine-learned models, and more specifically to generating text style variations using machine-learned models for content items.

Often times, content providers generate digital content items that are intended to induce desired responses from the viewers of the content items. Typically, the content items include visual content, such as an image or video, and text that is often a persuasive message to invite the desired responses from the viewers of the content items. The text of a content item may be characterized by the textual content that is the actual substance of the message, and the style of the text that encompasses the tone or mood of the text that is determined by factors such as word choice, punctuation, sentence structure, point of view, or formality of the text.

However, viewers respond differently depending on the style of text. For example, one viewer may respond to text written with a persuasion method based on scarcity, while another viewer may respond better to text written based on authority. However, it is difficult to automatically and efficiently generate such variations in text style. Machine learning based models such as convolutional neural networks are used to process digital content items and generate text based on the digital content item, for example, text that describes the content item. However, conventional neural networks do not handle variations in the style of the text to address viewers that respond differently to content items.

Figure 1:
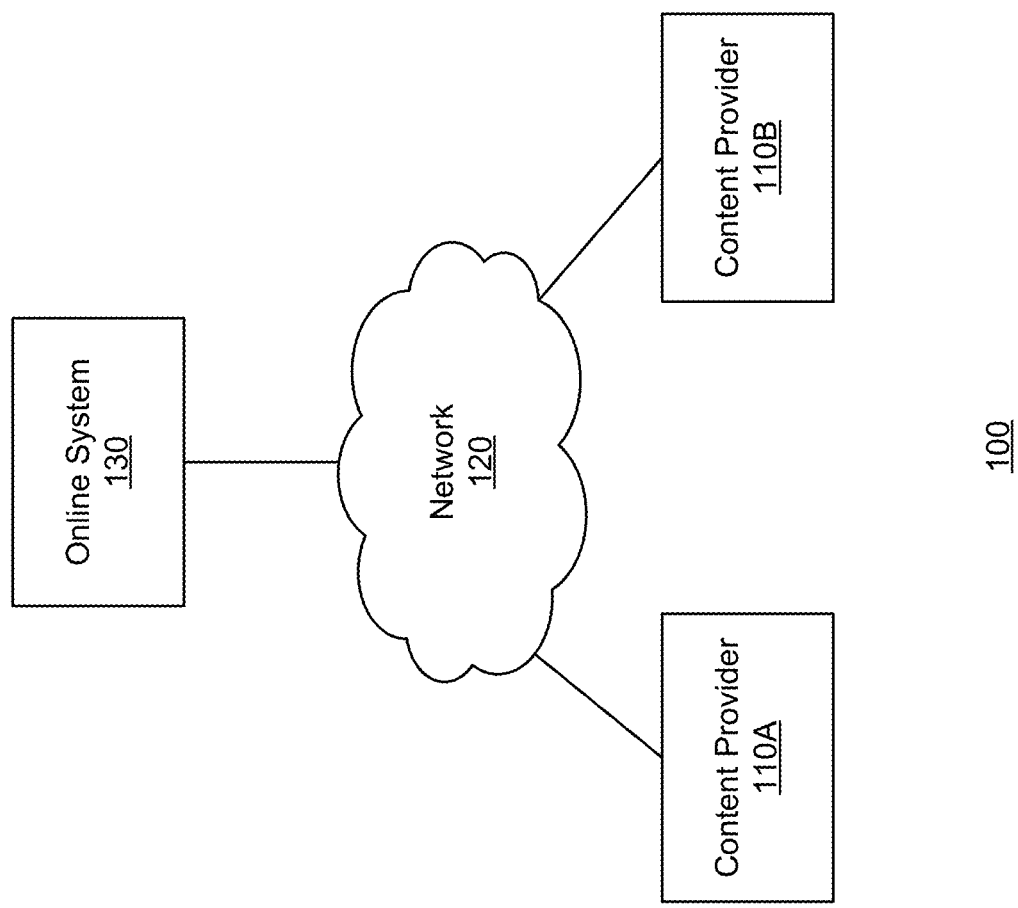
FIG. 1 is a block diagram of a system environment including an online system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

An online system, for a given reference content item, generates a set of content item variations that include different styles of text for the content item. The different styles of text are generated by applying one or more machine-learned style transfer models to reference text of the reference content item. The text variations retain the textual content of the reference text but are synthesized with different styles. The online system can provide the content item variations to users on an online experimental platform to collect user interaction information that may indicate how users respond to different styles of text. The online system or the content providers can effectively target users with content items that include the style of text the users respond to based on the collected information.

By using a machine-learned style transfer model to generate text variations, the online system can effectively and automatically generate different styles of text that correspond to a set of text styles in a computationally efficient manner. Moreover, a content provider or an online system may manage a significant number (e.g., hundreds or thousands) of accounts and content items at one time. The use of the machine-learned style transfer models allows the online system to quickly generate text variations for large amounts of content items, such that the content item variations can be provided to users of the online system.

Specifically, the online system obtains a reference content item including original content such as image or video and reference text. The textual content of the reference text may invite a viewer of the content item to perform a desired action or response. The online system generates a set of text variations corresponding to a set of text styles by applying the one or more machine-learned models to the reference text. Each text variation stylizes the textual content of the reference text in a respective text style. The online system generates a set of content item variations, where each content item variation includes the original content of the reference content item and a respective text variation. The online system provides the set of content item variations for display on one or more client devices.

System Environment

FIG. 1 is a block diagram of a system environment 100 including an online system 130, in accordance with an embodiment. The system environment 100 shown in FIG. 1 comprises an online system 130, content providers 110A, 110B, and a network 120. In alternative configurations, different and/or additional components may be included in the system environment 100.

The content providers 110 generate content items that are intended to invite desired responses from the viewers of the content items. For example, a content provider 110 may generate sponsored content items with the goal of increasing the number of users that interact or convert on the published sponsored content items. As another example, a content provider 110 may be an entity that provides content that are of interest to users of the content provider 110 and may provide the content on websites or webpages that are accessible via hyperlinks, such as a universal resource locator (URL). For example, the content provider 110 may be an online news entity that generates digital articles with the goal of increasing the number of readers that click on the articles or the number of subscribers to the online news entity. As yet another example, a content provider 110 may be an e-commerce platform that generates product pages with the goal of increasing the number of products sold to users.

Typically, content items that are generated by the content providers 110 include content, such as visual content of an image or video, and text that is a persuasive message to invite the desired responses from the viewers of the content items. For example, the text may be the advertisement copy, banners, or call-to-action (CTA) of a sponsored content item that calls the viewer to perform a desired action based on the sponsored content item. As another example, the text may be the product description of a product page that describes advantages of the product compared to other competitor products such that a user will purchase the particular product over others. As yet another example, the text may be the title or header of an online news article written to induce subscribers to click and open the article for viewing.

The text of the content item may be characterized by the textual content that is the actual substance of the message ("buy this product"), and the style of the text that encompasses the tone or mood of the text that is determined by factors such as word choice, punctuation, sentence structure, point of view, or formality of the text. However, viewers respond differently depending on the style of text. For example, one viewer may respond to text written with a persuasion method based on scarcity ("this offer ends soon" or "while supplies last"), while another viewer may respond better to text written based on authority ("experts recommend" or "professionals use"). Thus, it is advantageous for the content providers 110 to generate variations in the style of the text to address viewers that respond differently to content items.

In one embodiment, a content provider 110 provides a request to the online system 130 including one or more reference content items, and receives as a response, a set of content item variations that are generated based on the one or more reference content items but include different styles of text. Specifically, a reference content item acts as a reference for the set of content item variations and may include original content such as an image or video and reference text overlaid or adjacent to the original content. A content item variation may include the original content of the reference content item but a text variation that retains the textual content of the reference text but stylizes the reference text in a respective style. For example, a content variation may include the same image as the reference content item but a copy variation that stylizes the original copy in a respective style (e.g., scarcity or authoritative) placed at similar or same position as the original copy on the reference content item.

In one embodiment, the content provider 110 may specify a set of style categories in the request that indicates what types of text styles the content item variations should include. For example, the content provider 110 may interact with the online system 130 via an application or browser application, and may receive a list of style categories that are available and a request to select one or more of these categories for the set of content item variations. In another embodiment, the content provider 110 may not have a specified set of text styles and may instead request that the online system 130 determine the set of style categories for the set of content item variations.

In one embodiment, the content provider 110 may also receive as a response, user interaction information that indicates how different users responded to the set of content item variations when the content item variations were deployed on a network 120. In one instance, the content provider 110 may determine targeting criteria for each content item variation based on the user interaction information and may provide the targeting criteria to the online system 130 such that the content item variations can be targeted to users satisfying the specified criteria. For example, the online system 130 may additionally act as an ad exchange platform where advertisers and ad publishers can buy and sell ad inventory, and may generate and deploy a set of content variations to collect user interaction information. An advertiser as a content provider 110 may determine ad targeting criteria based on the user interaction information and provide the targeting criteria to the online system 130 or request that the online system 130 generate the targeting criteria itself, such that each content variation can be targeted to a subset of users satisfying the targeting criteria. As another example, the online system 130 may deploy the set of content variations on top of an experimentation platform, such as A/B testing or contextual random bandits. In another instance, the content provider 110 may be a provider of a chatbot application, and the text variations generated by the online system 130 may be different conversational styles used in the chatbot application. Users of the chatbot application may be influenced by the chatbot conversational styles, and a transfer algorithm for the style transfer model can be exploited to enhance the chatbot application's flexibility in conversational styles, leading to better personalized user communication.

In another embodiment, the content provider 110 only receives a set of content item variations as the response from the online system 130 and may provide the set of content item variations to a separate entity other than the online system 130 for deployment. For example, an advertiser may receive a set of content variations from the online system 130 and may provide the content variations to a separate ad exchange platform. The ad exchange platform may deploy the set of content variations and collect user interaction information. The content provider 110 may interact with the ad exchange platform to determine targeting criteria for the set of content variations, such that the content variations can be targeted to users who will likely interact with the content item based on the text style.

The content providers 110 may provide the requests and receive responses using one or more client devices. A client device may be a computing device such as a smartphone with an operating system such as ANDROID® or APPLE® IOS®, a tablet computer, a laptop computer, a desktop computer, or any other type of network-enabled device. A typical client device includes the hardware and software needed to connect to the network 120 (e.g., via WiFi and/or 4G, 5G or other wireless telecommunication standards). The client device may include an operating system and various applications that run on the operating system that enable the users to submit the requests. For example, the client device may include browser applications or standalone applications deployed by the online system 130 that allow users associated with the content providers 110 to interact with the online system 130 and submit the requests.

While the system environment 100 shown in FIG. 1 includes content providers 110 as examples, this is merely for illustration and it is appreciated that in other embodiments, the content providers 110 may be individual users, non-content related entities, or the like who can use client devices to interact with the online system 130.

The online system 130 receives requests to generate content item variations for one or more reference content items. A content item variation for a reference content item may include the original content of the reference content item but a text variation that retains the textual content of the reference text but stylizes the reference text in a respective style. In one embodiment, the online system 130 trains one or more machine-learned style transfer models coupled to receive an encoded version of the reference text and generate a set of text variations that stylizes the reference text in a set of text styles. The style transfer model includes a set of trained parameters. The online system 130 generates the set of text variations by applying the style transfer model to the encoded version of the reference text. In particular, the style transfer model may output the set of text variations in the form of a sequence of embedding vectors in a latent space, where each embedding vector represents a word or punctuation token. The online system 130 may tokenize the sequence of embedding vectors to map each embedding vector to a word or punctuation token using, for example, a stored dictionary. The online system 130 generates the set of content item variations by applying the set of text variations to the original content of the reference content item.

Figure 2A:
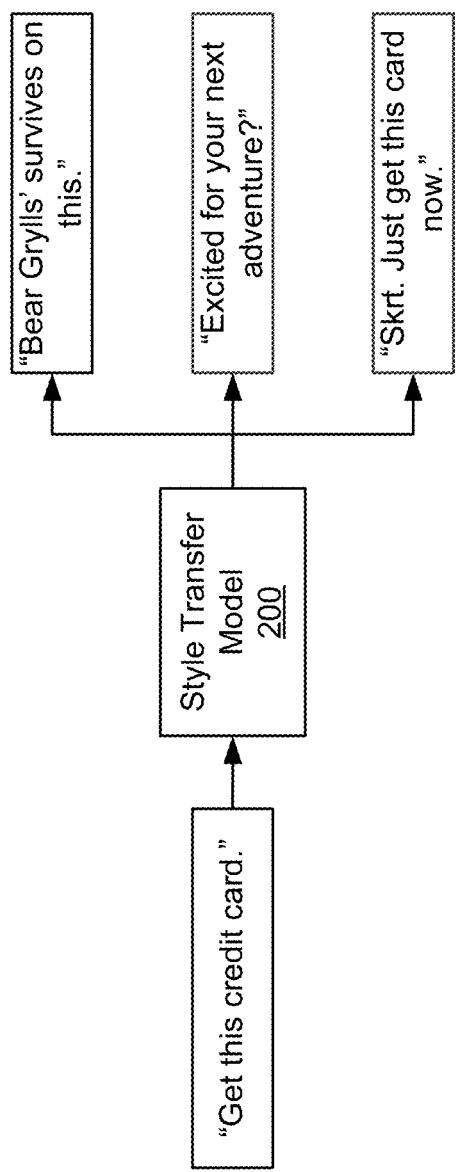
FIG. 2A illustrates a general process for using a machine-learned style transfer model to generate text variations from reference text, in accordance with an embodiment.

FIG. 2A illustrates a general process for using a machine-learned style transfer model 200 to generate text variations from reference text, in accordance with an embodiment. The online system 130 obtains a sponsored content item directed to frequent travelers as a reference content item and identifies the reference text on the sponsored content item. As shown in FIG. 2A, the reference text is the copy of the sponsored content item "[g]et this card." The online system 130 applies parameters of the style transfer model 200 to an encoded version of the reference text and generates a set of text variations that stylizes the reference text in a set of text styles. In the example shown in FIG. 2, the style transfer model 200 generates a first text variation "Bear Grylls' [famous adventurer and writer] survives on this." that corresponds to a text style of "authoritative," a second text variation "[e]xcited for your next adventure?" that corresponds to a text style of "inquisitive," a third text variation "[s]krt. Just get this card now." that corresponds to a text style of "time-sensitive."

In one embodiment, the architecture of the style transfer model includes an encoder coupled to receive an encoded version of the reference text and generate a text content embedding for the reference text. The text content embedding is a vector representation of the reference text in a latent space that characterizes the textual content of the reference text and is ideally agnostic to the style of the text. In such a latent space, a first text represented by a first embedding in the latent space is similar in textual content to a second text represented by a second embedding as the distance between the first embedding and the second embedding is closer to one another regardless of the styles of the texts. A style transfer model further includes a set of decoders each assigned to a respective text style. A decoder is coupled to receive the text content embedding and generates a text variation that stylizes the reference text in the respective text style assigned to the decoder.

Figure 2B:
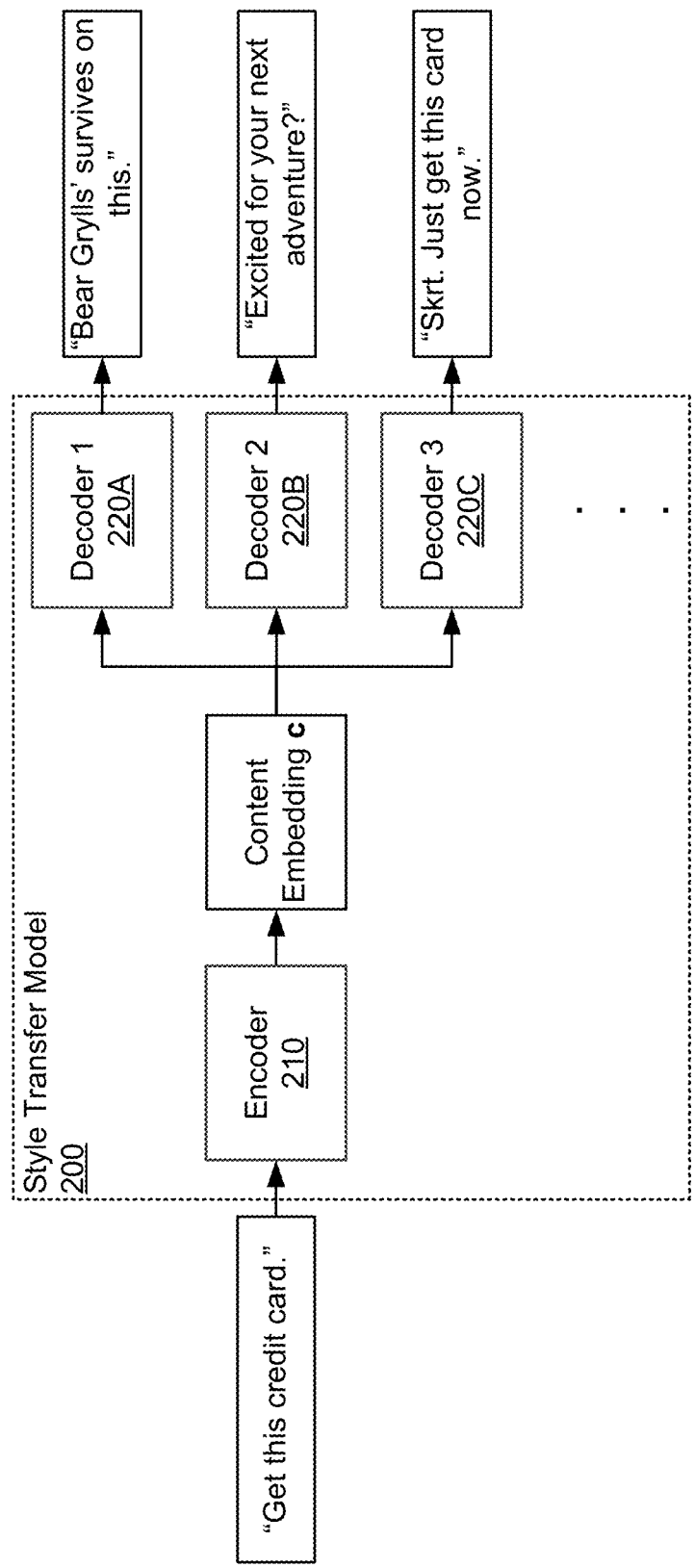
FIG. 2B illustrates a general process for using a machine-learned style transfer model to generate text variations from reference text, in accordance with another embodiment.

FIG. 2B illustrates a general process for using a machine-learned style transfer model to generate text variations from reference text, in accordance with another embodiment. As shown in FIG. 2B, the style transfer model includes an encoder 210 and a set of decoders including a first decoder 220A, a second decoder 220B, and a third decoder 220C among other decoders. Specifically, the online system 130 obtains a sponsored content item directed to frequent travelers as a reference content item and identifies the reference text on the sponsored content item. The online system 130 applies parameters of the encoder 210 to an encoded version of the reference text and generates a text content embedding c that characterizes the textual content of the reference text as a vector in a latent space.

The online system 130 applies the set of decoders 220 to the text content embedding c to generate a set of text variations that stylizes the reference text in a set of text styles. Specifically, each decoder may be trained to receive a text content embedding c and generate a text variation that stylizes the reference text in a respective text style assigned to the decoder. In the example shown in FIG. 2, the first decoder 220A is assigned the text style of "authoritative," and the online system 130 applies parameters of the first decoder 220A to the text content embedding c to generate the text variation "Bear Grylls' [famous adventurer and writer] survives on this." The second decoder 220B is assigned the text style of "inquisitive," and the online system 130 applies parameters of the second decoder 220B to the text content embedding c to generate the text variation "[e]xcited for your next adventure?" The third decoder 220C is assigned the text style of "time-sensitive," and the online system 130 applies parameters of the third decoder 220C to the text content embedding c to generate the text variation "[s]krt. Just get this card now."

While FIG. 2B illustrates an encoder and multi-decoder architecture for the style transfer model 200, it is appreciated that the architecture of the style transfer model can be any form that can be coupled to receive reference text and generate one or more text variations that stylize the reference text in one or more respective style categories, as discussed further in detail in conjunction with the modules of the online system 130. Specifically, the architecture of the style transfer model may be, but not limited to, architectures that extract the textual content of the reference text and/or the style of the reference text to stylize the reference text with respect to one or more style categories.

The online system 130 generates the set of content item variations by applying the set of text variations to the original content of the reference content item. For example, the reference content item may include as original content an image or video, and reference text that is overlaid on a particular position on the image or video. After generating the set of text variations, the online system 130 may generate a content item variation by replacing the reference text with a respective text variation at the same or similar position as the reference text on the image or video. As another example, the reference content item may include as original content another form of text, such as a news article, and reference text that is placed above the text as the title or headline. After generating the set of text variations, the online system 130 may generate a content item variation by replacing the reference text with a respective text variation as the title or headline of the text.

Figure 3:
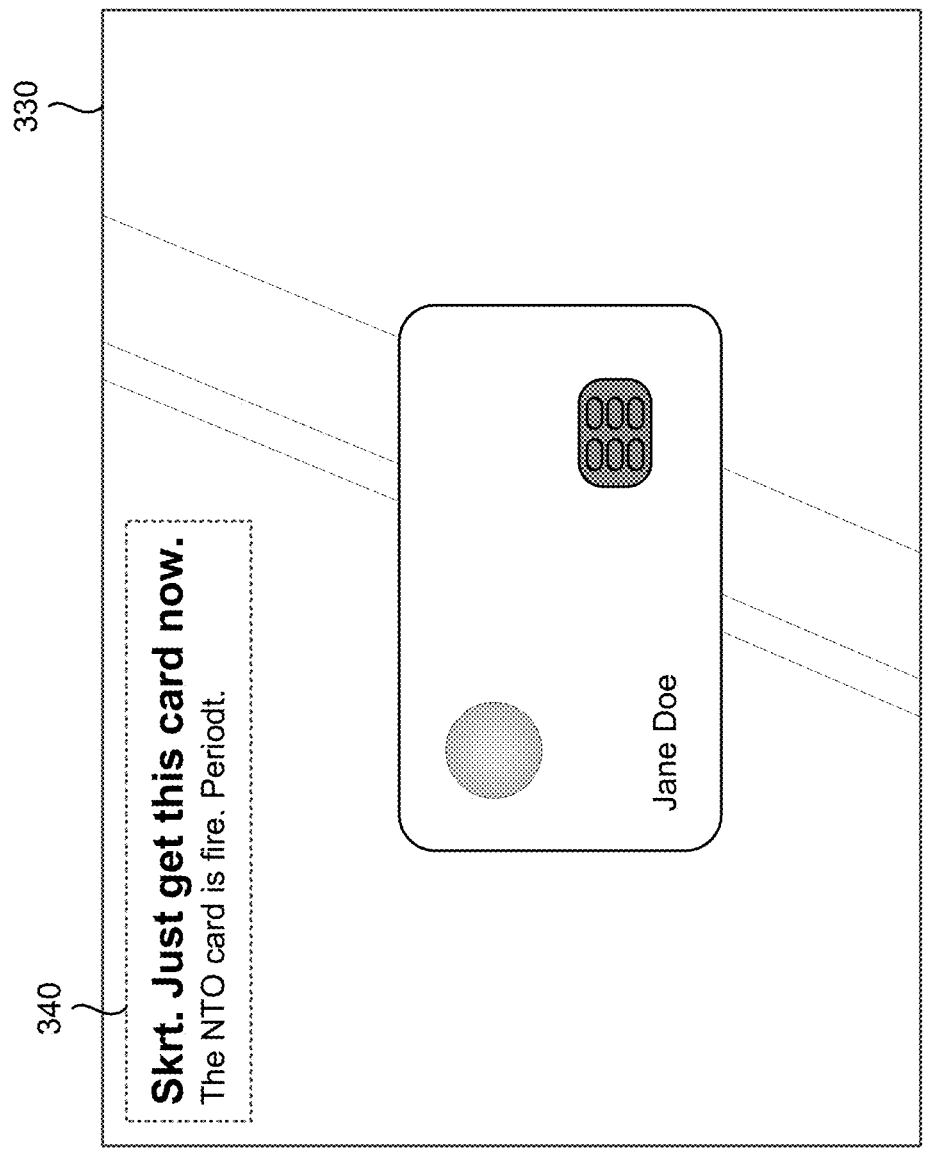
FIG. 3 illustrates an example content item variation including a text variation generated in FIGS. 2A-2B, in accordance with an embodiment.

FIG. 3 illustrates an example content item variation including a text variation generated in FIG. 2, in accordance with an embodiment. As shown in FIG. 3, the example content item variation is generated based on the reference content item that is a sponsored content item with the text variation generated by the third decoder 220C. Specifically, the online system 130 obtains an image 330 that was the original content of the sponsored content item, and places the text variation 340 at the same or similar position as the reference text on the image 330 to generate the content item variation. The online system 130 may repeat this process for other text variations to generate a set of content item variations that can be deployed on the network 120 to users. The online system 130 may provide the set of content item variations in the response to the content provider 110 or may also include the user interaction information after the content items have been deployed.

Returning to FIG. 1, the online system 130 trains the style transfer model using training data to reduce a loss function. Specifically, the training data includes multiple instances of data. Each training instance includes an encoded version of input text, a set of labels indicating whether the input text belongs to the set of style categories, and encoded versions of a set of stylized texts that stylizes the input text in the style categories that the style transfer model is configured to generate. For example, an instance in the training data may include an encoded version of input text "[b]uy this shirt now before offer ends," a label assigning the input text to a "time-sensitive" style category, and stylized texts that include "Taylor Swift loves this shirt" for a text style of "authoritative," "[w]hy don't you try this shirt for fun?" for a text style of "inquisitive," and the same text "[b]uy this shirt now before the offer ends," for a text style of "time-sensitive" among other categories.

As described in more detail later in conjunction with FIG. 4 with respect to the training process of the one or more style transfer models, in one embodiment, the online system 130 trains the parameters of the style transfer model in conjunction with an adversarial network that is coupled to receive the text content embedding generated by the encoder of the style transfer model and generate a set of predictions. A prediction generated by the adversarial network indicates a likelihood that an input text used to generate the text content embedding belongs to a respective style category.

Specifically, the loss function for the training process includes a generation loss for each decoder that decreases when a difference between an estimated text variation and the stylized text for the style category assigned to the decoder decreases. The estimated text variation is generated by applying the encoder to the input text for a training instance to generate an estimated text content embedding and applying the decoder to the estimated text content embedding to generate the estimated text variation. The generation loss may be a function of the parameters of the encoder and the decoders of the style transfer model.

The loss function also includes a first adversarial loss that decreases when a likelihood prediction for the style category assigned to an input text increases. The likelihood prediction for the style category is generated by applying the adversarial network to the estimated text content embedding for the input text. The first adversarial loss may be a function of the set of parameters of the adversarial network. The loss function also includes a second adversarial loss for the encoder that decreases when a likelihood prediction for a respective style category is different from the respective label for the style category. The second adversarial loss may be a function of the parameters of the encoder. The loss function may be represented as a combination of the generation loss, the first adversarial loss, and the second adversarial loss.

For each training iteration, the parameters of the encoder, the decoders, and the adversarial network are updated to reduce the loss function. By reducing the generation loss, the parameters of the encoder are configured to output a text content embedding for an input text that when synthesized by the parameters of each decoder, generates a text variation that stylizes the input text in the style category for the decoder. By reducing the first adversarial loss and the second adversarial loss in an alternate manner, the parameters of the encoder are configured to output a text content embedding for the input text for which the adversarial network is not able to identify the text style for, such that the text content embedding characterizes the textual content of the input text agnostic to the style of the input text.

In one embodiment, the online system 130 trains multiple style transfer models based on affiliations such as the brand, the company or organization, industry vertical associated with the request. The style transfer models may differ from one another with respect to the architecture, for example, the number of decoders and which types of text styles the decoders are configured to synthesize, number of parameters, and the like. Responsive to receiving the request, the online system 130 identifies one or more affiliations of the reference content item and selects an appropriate style transfer model and generates the set of content item variations using the selected model. For example, the online system 130 may train multiple style transfer models on a per-manufacturer basis. Responsive to receiving a request from a particular manufacturer, the online system 130 may select a style transfer model trained for the particular manufacturer and generate the set of content item variations using the selected model.

Returning to FIG. 1, the network 120 provides a communication infrastructure between the content providers 110 and the online system 130. The network 120 is typically the Internet, but may be any network, including but not limited to a Local Area Network (LAN), a Metropolitan Area Network (MAN), a Wide Area Network (WAN), a mobile wired or wireless network, a private network, or a virtual private network.

Online System

Figure 4:
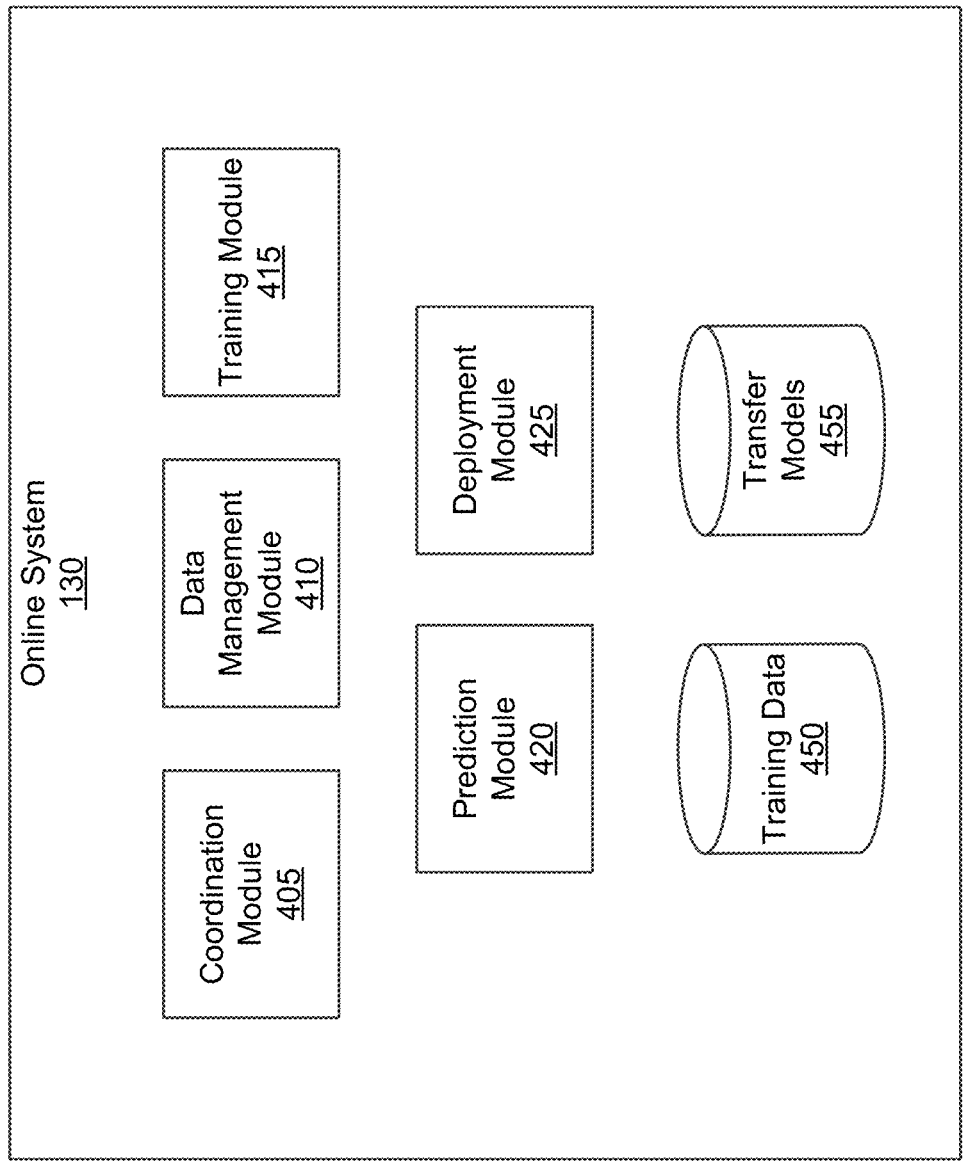
FIG. 4 is a block diagram of an architecture of the online system, in accordance with an embodiment.

FIG. 4 is a high-level block diagram illustrating a detailed view of the online system 130, in accordance with an embodiment. The online system 130 is comprised of modules including a coordination module 405, a data management module 410, a training module 415, a prediction module 420, and a deployment module 425. The online system 130 also includes a training data datastore 450 and a transfer models datastore 455. Some embodiments of the online system 130 have different modules than those described here. Similarly, the functions can be distributed among the modules in a different manner than is described here.

The coordination module 405 coordinates the training of one or more style transfer models with other modules of the online system 130. In one embodiment, the coordination module 405 requests training of multiple style transfer models based on one or more affiliations. In one instance, the affiliations are the brand, the organization (e.g., company, government entity, school or university), or the industry vertical associated with the content items. For example, the brand may refer to a line of products that are manufactured by the same company or under a particular name. The coordination module 405 may request that multiple style transfer models are trained on a per-brand basis, and a style transfer model can be tailored for requests associated with a particular brand (e.g., "Pepsi" or "Nike"). As another example, the coordination module 405 may request that multiple style transfer models are trained on a per-vertical basis, and a style transfer model can be tailored for requests associated with the automotive industry.

In one embodiment, the coordination module 405 also requests training of style transfer models that are configured to address a set of style categories. For example, a particular manufacturer may specify a set of style categories in their request, and the coordination module 405 may have access to this information such that it can request the style transfer model for the manufacturer includes decoders that address these specified style categories. As another example, the style categories may be shared across one or more style transfer models as default. For example, the set of style categories can include the text style "scarcity" to generate text variations that use fear of shortage to sell more (e.g., "this offer ends soon" or "while supplies last"), the text style "exclusivity" to generate text variations that use the likeness of exclusive products to sell more (e.g., "with money to burn" or "fancy pets prefer"), the text style "authority" to generate text variations that use endorsement from third parties they trust to persuade (e.g., "experts recommend" or "professionals use"), the text style "social proof" to generate text variations that say what other people do to sell more (e.g., "everyone is taking advantage" or "people who try it prefer"), the text style "commitment" to generate text variations that use commitment from long-standing customers (e.g., "our customers keep coming back"), the text style of "liking" to generate text variations that compliments the viewer or the reader (e.g., "you're beautiful"), or the text style "reciprocity" to generate text variations that use small rewards upfront to sell a bigger product (e.g., "get a reward when you buy").

In another embodiment, the set of style categories do not have actual meaning but may be defined with respect to positions in a latent space. In such an instance, the coordination module 405 may map known texts to embeddings in a latent space and identify one or more clusters of texts that can each be defined as a style category. The coordination module 405 may request training of style transfer models that are configured to output text variations that when mapped to the same latent space, belong to the style categories defined by the clusters.

In yet another embodiment, the coordination module 405 does not define a set of explicit style categories, but instead characterizes the "style" of text with respect to characteristics such as NLP attributes or scores, such as sentiment, semantic relatedness, tone, brevity, sentence structure, fluency, or other readability metrics. By characterizing text in this manner, the training process of the style transfer model can reduce dependence on expensive parallel style training data.

The data management module 410 generates and manages training data for training one or more machine-learned style transfer models. As described above in conjunction with the online system 130, in one embodiment, a training instance may include an encoded version of input text, a set of labels indicating whether the input text belongs to the set of style categories, and encoded versions of a set of stylized texts that stylizes the input text in the set of style categories a style transfer model is configured to generate. In one embodiment, when the text variations are defined with respect to characteristics instead of explicit style categories, the training data may include labels that indicate these metrics for the input text. The data management module 410 may collect the training data from various sources, including previously processed content items, online websites, or annotations obtained from human operators. For example, the labels and stylized texts of a training instance may be obtained by a human operator that reviews input texts and assigns the input texts to one or more style categories and generates stylized texts for the input texts.

The data management module 410 may collect and tag the training data into subsets of data based on requests provided by the coordination module 405. For example, responsive to a request from the coordination module 405 to train one or more style transfer models on a per-brand basis, the data management module 410 may collect training data for a set of specified brands and may tag the training data into subsets that each belong to a particular brand. As another example, responsive to a request from the coordination module 405 to train one or more style transfer models configured to generate text variations for a specified set of style categories, the data management module 410 may collect stylized texts written in those style categories and include the data in the relevant subsets of data or the training data as a whole.

The data management module 410 encodes the training data into a mathematical form that can be processed by the style transfer model. In one instance, the input text $x_i$ of a training instance i is encoded as a series of word tokens $x_{i,1}$, $x_{i,2}$, . . . , $x_{i,Tx}$ where each word token $x_{i,k}$ is a word embedding representing the word as a vector in a latent space or alternatively, a one-hot encoded vector where each element corresponds to a word in a dictionary and assumes a value of one if the token represents that word and zero otherwise. Similarly, a stylized text $y^j_i$ of a training instance for a style category j=1, 2, . . . , N is encoded as a series of word tokens $y^j_{i,1}$, $y^j_{i,2}$, . . . , $y^j_{i,Tyj}$ where each word token $y^j_{i,k}$ is a word embedding in a latent space same or different from the latent space of the input text. In one instance, the set of labels $l^1_i$, $l^2_i$, . . . , $l^N_i$ of a training instance each indicate whether the input text should be assigned to a respective style category j. For example, a label $l^j_i$ for a training instance may assume a value of one if the input text belongs to style category j and zero otherwise.

In one embodiment, the data management module 410 may also perform preprocessing on the training data before the data is used to train the style transfer models. For example, the data management module 410 may analyze the training corpus and may automatically prune data instances that are associated with similar or duplicative styles and may remove labels with low semantic similarity. For example, the data management module 410 may delete text sentence pairs that share more than 60% trigram overlap to increase or maximize lexical and syntactic diversity in the training data.

The training module 415 trains one or more machine-learned style transfer models that are coupled to receive an input text and generate a set of text variations for the input text. A style transfer model may include an encoder and multiple decoders. In one embodiment, the encoder and each decoder of the style transfer model is configured as a neural network model that includes one or more layers with a set of parameters. In one instance, the encoder is configured with a recurrent neural network (RNN) architecture configured to receive a sequence of tokens for the input text and generate a text content embedding. In one instance each decoder is configured with an RNN architecture configured to receive the text content embedding and generate a sequence of tokens as a respective text variation. In another instance, the encoder and the decoder is configured as a variant of a transformer network architecture that includes one or more stacked multi-head attention layers.

The training module 415 generates and initializes architectures of one or more style transfer models based on requests provided by the coordination module 405. For example, responsive to a request from the coordination module 405 to train one or more style transfer models on a per-vertical basis, the training module 415 may retrieve the appropriate subsets of data from the training datastore 450 that have been stored by the data management module 410 to train each style transfer model. The training module 415 may also configure the architecture of a style transfer model to address the set of text styles that are requested by the style transfer model. For example, when the style transfer model has an encoder and multi-decoder architecture as shown in FIG. 2, the training module 415 may generate a number of decoders to address the specified set of style categories, such that each decoder can be trained with stylized text in a respective style category for the decoder.

In one embodiment, the training module 415 trains the style transfer model by repeatedly iterating between a forward pass step and a backpropagation step to reduce the loss function. During the forward pass step, the training module 415 obtains a batch of training instances i∈S. The training module 415 generates a set of estimated text variations by applying estimated parameters of the style transfer model to the input text $x_{i \in S}$ in the batch. The training module 415 determines a loss function that at least decreases when a difference between an estimated text variation generated by the decoder and the stylized text $y^j_{i \in S}$, j=1, 2, . . . , N, for the respective style category j decreases. During the backpropagation step, the training module 415 updates the set of parameters of the style transfer model by backpropagating error terms from the loss function. This process is repeated for the next batch of training data until a convergence criteria for the parameters is reached.

Figure 5A:
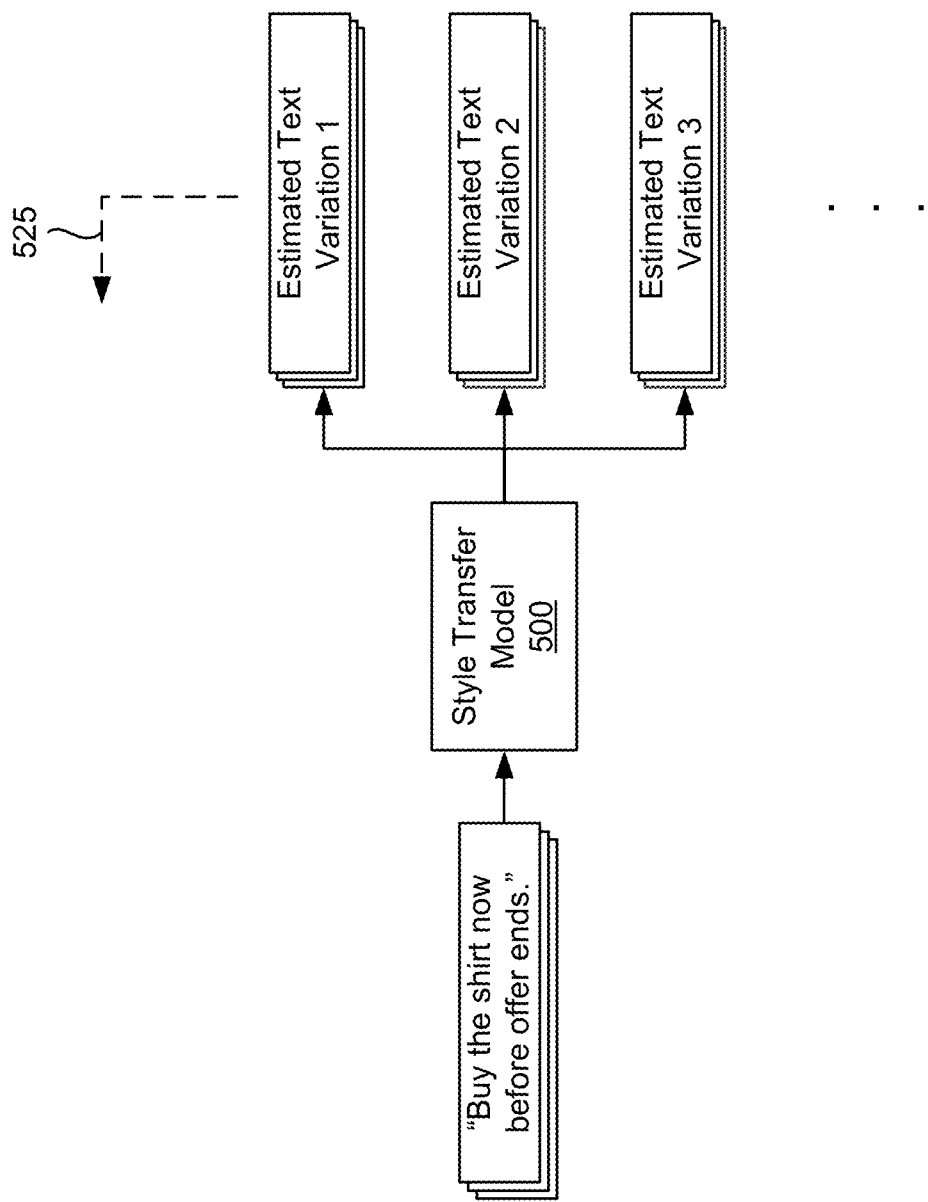
FIG. 5A illustrates a process of training the style transfer model, in accordance with an embodiment.

FIG. 5A illustrates a process of training the style transfer model 500, in accordance with another embodiment. The example shown in FIG. 5A illustrates one training iteration. During the forward pass step, parameters of the style transfer model 500 are applied to input text $x_{i \in S}$ that includes "[b]uy this shirt now before offer ends" as the first instance $x_1$ to generate estimated text variations 1, 2, and 3. The training module 415 determines a generation loss 525 from the estimated text variations. The parameters of the style transfer model 500 are backpropagated with error terms obtained from the loss function to reduce the loss function. This process is repeated for the next batch of training data until a convergence criteria is reached for the parameters. The training module 415 stores the trained models in the transfer models datastore 455.

As described in conjunction with FIG. 1, in one embodiment, the training module 415 trains the set of parameters of a style transfer model in conjunction with one or more adversarial networks. The one or more adversarial networks may be coupled to receive some form of extracted textual content of the reference text and generate a set of style predictions. For example, when the style transfer model has an encoder and multi-decoder architecture, an adversarial network is coupled to receive the text content embedding generated by the encoder and generate a set of style predictions. In one instance, the adversarial network is also configured as a neural network model that includes one or more layers with a set of parameters. A prediction generated by the adversarial network indicates a likelihood that the input text used to generate the text content embedding belongs to a respective style category in the set of style categories.

The training module 415 also trains such a style transfer model by repeatedly iterating between a forward pass step and a backpropagation step to reduce the loss function. In one embodiment, when the style transfer model is an encoder-decoder architecture, the training module 415 generates estimated text content embeddings by applying estimated parameters of the encoder to the encoded version of the input text $x_{i \in S}$ in the batch of training data. The training module 415 also generates a set of estimated text variations by applying estimated parameters of the set of decoders to the estimated text content embedding. The training module 415 also generates a set of style predictions by applying estimated parameters of the adversarial network to the estimated text content embedding.

The training module 415 determines a loss function that includes the generation loss, the first adversarial loss, and the second adversarial loss. The generation loss for a j-th decoder decreases when a difference between an estimated text variation generated by the decoder and the stylized text $y^j_{i \in S}$, j=1, 2, . . . , N, for the style category j decreases. The first adversarial loss is a function of the parameters of the adversarial network and decreases when a likelihood prediction for the style category assigned to an input text $x_{i \in S}$ (i.e., the j-th style category for which the label $l^j_{i \in S}$ is a value of one) increases, or when the adversarial network correctly predicts the style category of the input text $x_{i \in S}$. The second adversarial loss is a function of the parameters of the encoder and decreases when a likelihood prediction for a respective style category j is different from the respective label $l^j_{i \in S}$ for the style category, or when the adversarial network incorrectly predicts the style category of the input text $x_{i \in S}$. The loss function may be a combination of the generation loss, the first adversarial loss, and the second adversarial loss.

During the backpropagation step, the training module 415 updates the set of parameters of the style transfer model and the adversarial network by backpropagating error terms from the loss function. Specifically, the estimated parameters of the encoder are updated based on error terms backpropagated from the generation loss and the second adversarial loss, the estimated parameters of each decoder are updated based on error terms backpropagated from the generation loss, and the estimated parameters of the adversarial network are updated based on error terms backpropagated from the first adversarial loss. This process is repeated for the next batch of training data until a convergence criterion for the parameters is reached. In one embodiment, the training module 415 may perform the training process with an ADAM or RMS Prop method with a relatively low learning rate and low momentum and, for example, 50% dropout during training and generation. For noise vectors that are needed in these training methods, the training module 415 may sample random latent codes from a gaussian or spherical uniform distribution.

Figure 5B:
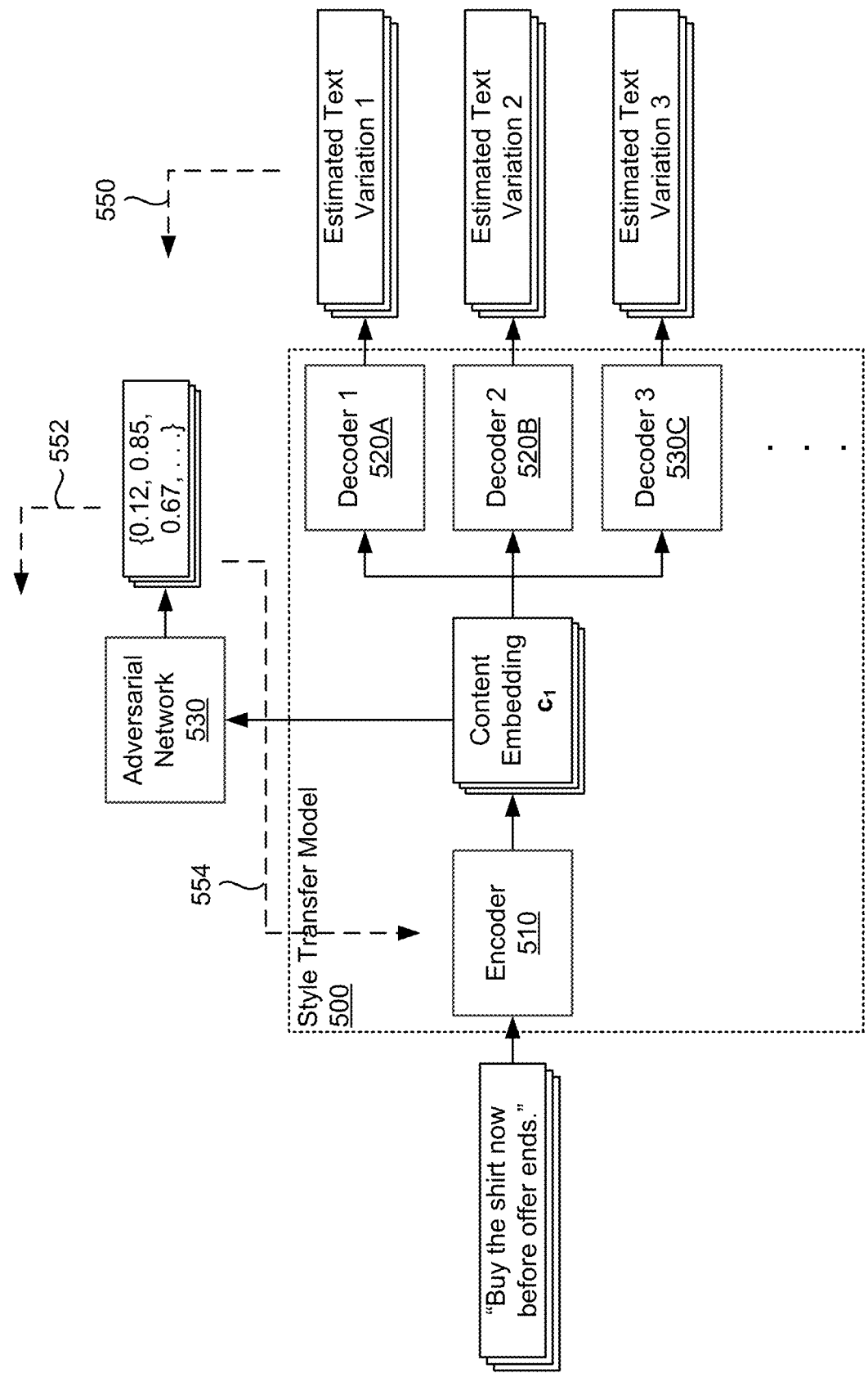
FIG. 5B illustrates a process of training the style transfer model with an encoder-decoder architecture, in accordance with another embodiment.

FIG. 5B illustrates a process of training the style transfer model with an encoder-decoder architecture, in accordance with another embodiment. The example shown in FIG. 5B illustrates one training iteration. During the forward pass step, parameters of the encoder 510 are applied to input text $x_{i \in S}$ that includes "[b]uy this shirt now before offer ends" as the first instance $x_1$ to generate an estimated text content embedding. The parameters of the decoders 520A, 520B, 520C, . . . are applied to the estimated text content embedding to generate estimated text variations for each decoder. The parameters of the adversarial network 530 are applied to the estimated text content embeddings to generate style predictions for each instance. As shown in FIG. 5, the adversarial network 530 generates a prediction likelihood of 0.12 that the input text is authoritative, a prediction likelihood of 0.85 the input text is inquisitive, and a prediction likelihood of 0.67 the input text is time-sensitive among other predictions.

The training module 415 determines a generation loss 550 from the estimated text variations, a first adversarial loss 552 from the style predictions, and the second adversarial loss 554 from the style predictions. The parameters of the encoder 510, decoders 520A, 520B, 520C, . . . , and the adversarial network 530 are backpropagated with error terms obtained from the loss function to reduce the loss function. This process is repeated for the next batch of training data until a convergence criteria is reached for the parameters. The training module 415 stores the trained models in the transfer models datastore 455.

As described in conjunction with FIG. 1, the architecture of the style transfer model is not limited to those shown in FIGS. 2A-2B and 5A-5B but may be in any form that can be coupled to receive reference text and generate one or more text variations that stylize the reference text in one or more respective style categories. For example, while FIGS. 2A-2B and 5A-5B illustrate a style transfer model that is configured output multiple outputs, the style transfer model may also include a set of individual models that are each coupled to receive the reference text and output a stylized text in a respective style. As another example, the style transfer model may be coupled to receive input text and extract a text content embedding that represents the actual content of the input text and/or a text style embedding that represents the target style of the input text. The text content embedding and/or the text style embedding may be input to a decoder to synthesize a text variation that stylizes the input text in the target style.

However, it is also appreciated that the style transfer model is not limited to those architectures that target to disentangle the textual content and style of the input text, and can also include models that transfer style without style-content disentanglement, using methods such as reinforcement and probabilistic learning.

As another example, the style transfer model may be capable of being trained in a multi-pair style transfer method using parallel and/or non-parallel training data. Specifically, such a style transfer model is coupled to receive training data that spans multiple tasks (e.g., each task may be data from a different entity or brand), in which data for each task may vary significantly in many aspects (e.g., in terms of text styles, labeling methods, structure of the data). The style transfer model can adaptively learn from the parallel and/or non-parallel training data in a single model and is able to perform style transfer in multiple text styles or domains when trained.

As yet another example, the style transfer model may generally be a generative model including, but not limited to, transformer NLP architectures, variational autoencoders (VAE), generative adversarial networks (GAN), score-based generative models, restricted Boltzmann machines, generative matching networks, invertible networks, or natural language processing (NLP) models. Moreover, the training module 415 may also incorporate the choice of model structure as a hyperparameter that can be experimented with. For example, the training module 415 can partially train different structural variants of the style transfer model and allow them to compete with one another for a predetermined amount of time on a certain portion of the training data.

Returning to FIG. 4, the prediction module 420 receives requests from content providers 110 and uses the style transfer models to generate a set of content item variations for the request. The prediction module 420 identifies the reference text as included in the request or from the reference content item. The prediction module 420 applies a style transfer model to the reference text to generate a set of text variations for the reference text. In one embodiment, the prediction module 420 identifies an affiliation associated with the request and selects an appropriate style transfer model from the transfer models datastore 455 for use. For example, responsive to receiving a request from an advertiser for a particular manufacturer, the prediction module 420 may check whether a style transfer model trained for that manufacturer is stored in the transfer models datastore 455, and if so, apply the selected model to the reference text to generate the set of text variations. As another example, if a style transfer model specific to the manufacturer is not available, the prediction module 420 may apply a default or shared style transfer model to the reference text to generate the set of text variations.

The prediction module 420 generates the set of content item variations by obtaining the original content of the reference content item as included in the request or as extracted from the reference content item. The prediction module 420 applies each text variation to the original content of the reference content item to generate the set of content item variations. As described in conjunction with FIG. 1, the prediction module 420 may place the text variation at the same or similar position as the reference text on or adjacent to the original content of the reference content item. The prediction module 420 provides the set of content item variations to the originator of the request as the response. In one embodiment, the prediction module 420 may receive user interaction information for the content item variations from other modules of the online system 130 and may also provide the user interaction information as the response.

The deployment module 425 receives the set of content item variations from the prediction module 420 and generates user interaction information by deploying the content item variations on the network 120. In one embodiment, the deployment module 425 deploys the content item variations using a A/B testing or multi-arm bandit (MAB) platform to collect the user interaction information to display the content item variations to users of one or more client devices. The deployment module 425 collects information on whether the users of the client devices interacted with the content item variations. For example, a set of content variations may be deployed on various content publisher websites where user interaction information, such as click-through rate (CTR), conversion rate (CVR), or other types of actions related to the conversion funnel are collected. The deployment module 425 provides this information to the prediction module 420 such that the user interaction information can be provided in the response to the request.

In one embodiment, responsive to a request, the deployment module 425 may determine targeting criteria for each of the content item variations that specify characteristics of users that should be targeted with the respective content item. For example, the deployment module 425 may determine characteristics of users who had high likelihoods of interaction with a content item variation, and may target new users or other users on the network 120 that have those identified characteristics with the content item variation. In this manner, the deployment module 425 can target users with content items that have text styles that the users most likely respond to, increasing user response to the content items.

Method of Generating Content Item Variations

Figure 6:
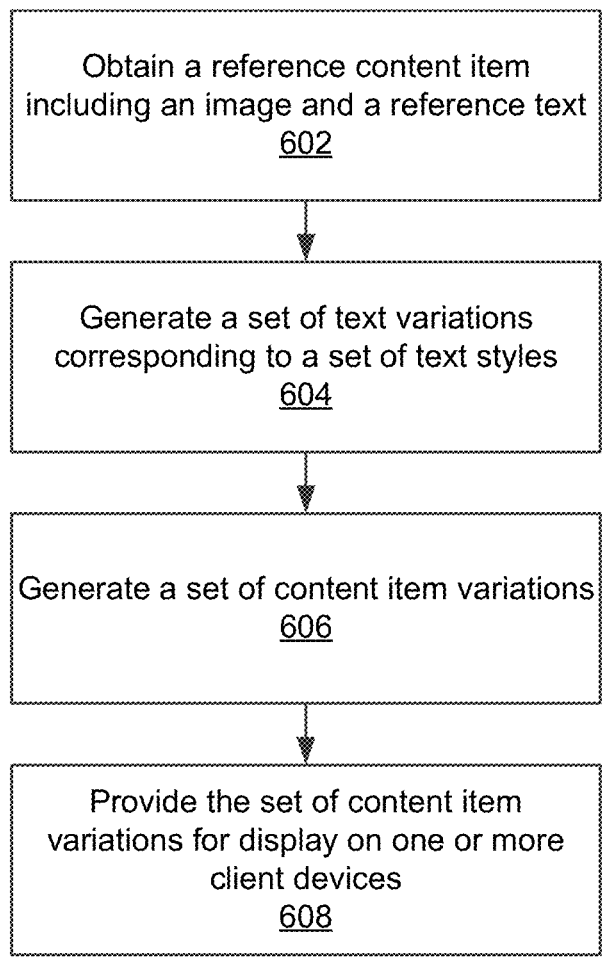
FIG. 6 is a flowchart illustrating a method of generating a set of content item variations, in accordance with an embodiment.

FIG. 6 is a flowchart illustrating a method of generating a set of content item variations, in accordance with an embodiment. In one embodiment, the process of FIG. 6 is performed by various modules of the online system 130.

Other entities may perform some or all of the steps of the process in other embodiments. Likewise, embodiments may include different and/or additional steps, or perform the steps in different orders.

The online system 130 obtains 602 a reference content item including an image and a reference text from a client device of a request. The textual content of the reference text may invite a viewer of the content item to perform a desired response. The online system 130 generates 604 a set of text variations corresponding to a set of text styles by applying a machine-learned model to the reference text. Each text variation stylizes the textual content of the reference text in a respective text style in the set of text styles. The online system 130 generates 606 a set of content item variations using the set of text variations. Each content item variation includes the image and a respective text variation. The online system 130 provides 608 the set of content item variations to one or more client devices as a response to a request.

Computer Architecture

Figure 7:
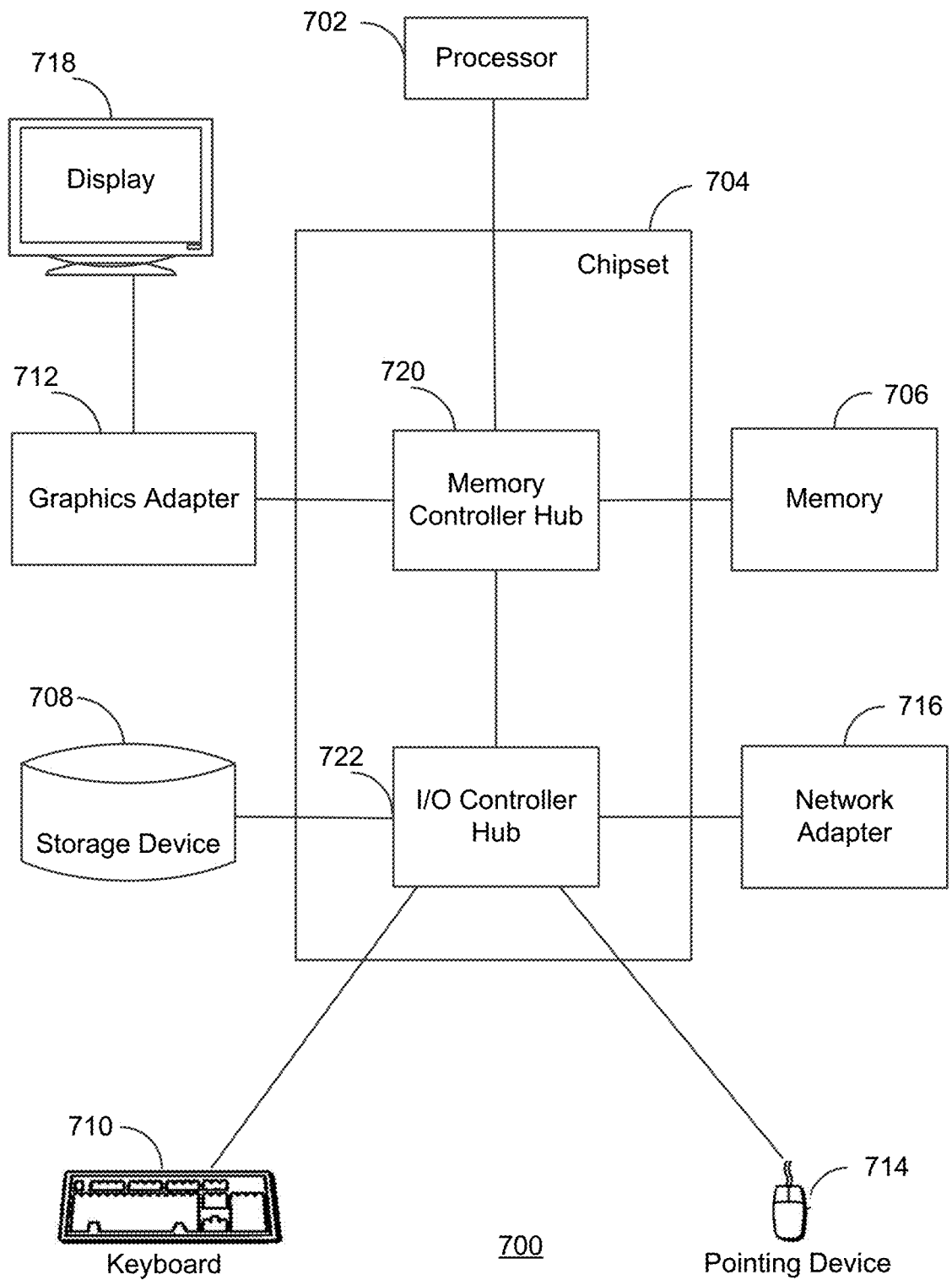
FIG. 7 is a block diagram illustrating the architecture of a typical computer system for use in the environment of FIG. 1, in accordance with an embodiment.

FIG. 7 is a block diagram illustrating the architecture of a typical computer system for use in the environment of FIG. 1 according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 608 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 616 couples the computer system 700 to a network.

As is known in the art, a computer 700 can have different and/or other components than those shown in FIG. 7. In addition, the computer 700 can lack certain illustrated components. For example, a computer system 700 acting as an online system 130 may lack a keyboard 710 and a pointing device 714. Moreover, the storage device 708 can be local and/or remote from the computer 700 (such as embodied within a storage area network (SAN)).

The computer 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The types of computer systems 700 used by the entities of FIG. 1 can vary depending upon the embodiment and the processing power used by the entity. For example, a client device 110 may be a mobile phone with limited processing power, a small display 718, and may lack a pointing device 714. The online system 130 in contrast, may comprise multiple blade servers working together to provide the functionality described herein.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
    receiving, by an online system, a request including a reference content item, wherein the reference content item includes an image and a reference text that invites a viewer of the reference content item to perform a desired response;
    applying, by the online system, a machine-learned model to the reference text to generate a set of text variations corresponding to a set of text styles, wherein each text variation stylizes the textual content of the reference text in a respective text style in the set of text styles, wherein the machine-learned model includes an encoder and a set of decoders each assigned to a respective text style, and applying the machine-learned model further comprises:
        applying the encoder to an encoded version of the reference text to generate a text content embedding, the text content embedding characterizing textual content of the reference text, and
        for each decoder, applying the decoder to the text content embedding to generate a text variation that styles the reference text in the respective text style assigned to the decoder;
    generating, by the online system, a set of content item variations, each content item variation including the image and a respective text variation; and
    providing, to one or more client devices, the set of content item variations for display on one or more client devices.

2. The computer-implemented method of claim 1, further comprising:
    obtaining, by the online system, information on whether users of the one or more client devices interacted with the set of content item variations, and
    using the obtained information to determine targeting criteria for targeting the set of content item variations.

3. The computer-implemented method of claim 1, wherein the encoder is configured as a recurrent neural network (RNN) architecture configured to receive a sequence of tokens for the reference text to generate the text content embedding.

4. The computer-implemented method of claim 1, wherein each decoder is configured as a recurrent neural network (RNN) architecture configured to receive the text content embedding and generate a sequence of tokens as the text variation for the decoder.

5. The computer-implemented method of claim 1, wherein the respective text variation for a content item variation is placed at a position of the reference text on the image of the reference content item.

6. The computer-implemented method of claim 1, wherein a set of parameters of the machine-learned model are trained in conjunction with an adversarial network, the adversarial network coupled to receive an output generated by applying the machine-learned model to an input text, and generate one or more likelihood predictions that indicate whether the input text is in one or more text styles.

7. The computer-implemented method of claim 1, further comprising:
    training, by the online system, a plurality of machine-learned models, each machine-learned model for use with requests associated with a respective affiliation, and
    responsive to receiving the request, identifying an affiliation associated with the request and selecting a machine-learned model for use based on the identified affiliation.

8. The computer-implemented method of claim 7, wherein the respective affiliation is a brand of a product advertised in the reference content item or a manufacturer of the product advertised in the reference content item.

9. The computer-implemented method of claim 1, wherein the reference content item is a sponsored content item describing a product.

10. A non-transitory computer-readable storage medium storing computer program instructions executable to perform operations, the operations comprising:
    receiving, by an online system, a request including a reference content item, wherein the reference content item includes an image and a reference text that invites a viewer of the reference content item to perform a desired response;
    applying, by the online system, a machine-learned model to the reference text to generate a set of text variations corresponding to a set of text styles, wherein each text variation stylizes the textual content of the reference text in a respective text style in the set of text styles, wherein the machine-learned model includes an encoder and a set of decoders each assigned to a respective text style, and applying the machine-learned model further comprises:
        applying the encoder to an encoded version of the reference text to generate a text content embedding, the text content embedding characterizing textual content of the reference text, and
        for each decoder, applying the decoder to the text content embedding to generate a text variation that styles the reference text in the respective text style assigned to the decoder;
    generating, by the online system, a set of content item variations, each content item variation including the image and a respective text variation; and
    providing, to one or more client devices, the set of content item variations for display on one or more client devices.

11. The non-transitory computer-readable storage medium of claim 10, further comprising:
    obtaining, by the online system, information on whether users of the one or more client devices interacted with the set of content item variations, and
    using the obtained information to determine targeting criteria for targeting the set of content item variations.

12. The non-transitory computer-readable storage medium of claim 11, wherein the encoder is configured as a recurrent neural network (RNN) architecture configured to receive a sequence of tokens for the reference text to generate the text content embedding.

13. The non-transitory computer-readable storage medium of claim 11, wherein each decoder is configured as a recurrent neural network (RNN) architecture configured to receive the text content embedding and generate a sequence of tokens as the text variation for the decoder.

14. The non-transitory computer-readable storage medium of claim 10, wherein the respective text variation for a content item variation is placed at a position of the reference text on the image of the reference content item.

15. The non-transitory computer-readable storage medium of claim 10, wherein a set of parameters of the machine-learned model are trained in conjunction with an adversarial network, the adversarial network coupled to receive an output generated by applying the machine-learned model to an input text, and generate one or more likelihood predictions that indicate whether the input text is in one or more text styles.

16. The non-transitory computer-readable storage medium of claim 10, further comprising:
training, by the online system, a plurality of machine-learned models, each machine-learned model for use with requests associated with a respective affiliation, and
responsive to receiving the request, identifying an affiliation associated with the request and selecting a machine-learned model for use based on the identified affiliation.

17. The non-transitory computer-readable storage medium of claim 16, wherein the respective affiliation is a brand of a product advertised in the reference content item or a manufacturer of the product advertised in the reference content item.

18. The non-transitory computer-readable storage medium of claim 10, wherein the reference content item is a sponsored content item describing a product.

19. A computer system comprising:
a computer processor; and
a non-transitory computer-readable storage medium storing computer program instructions executable to perform operations, the operations comprising:
receiving, by an online system, a request including a reference content item, wherein the reference content item includes an image and a reference text that invites a viewer of the reference content item to perform a desired response;
applying, by the online system, a machine-learned model to the reference text to generate a set of text variations corresponding to a set of text styles, wherein each text variation stylizes the textual content of the reference text in a respective text style in the set of text styles, wherein the machine-learned model includes an encoder and a set of decoders each assigned to a respective text style, and applying the machine-learned model further comprises:
applying the encoder to an encoded version of the reference text to generate a text content embedding, the text content embedding characterizing textual content of the reference text, and
for each decoder, applying the decoder to the text content embedding to generate a text variation that styles the reference text in the respective text style assigned to the decoder;
generating, by the online system, a set of content item variations, each content item variation including the image and a respective text variation; and
providing, to one or more client devices, the set of content item variations for display on one or more client devices.

* * * * *